May 18, 1954  A. A. KALINSKE  2,678,914
APPARATUS FOR TREATING POLLUTED LIQUIDS
Filed April 2, 1949
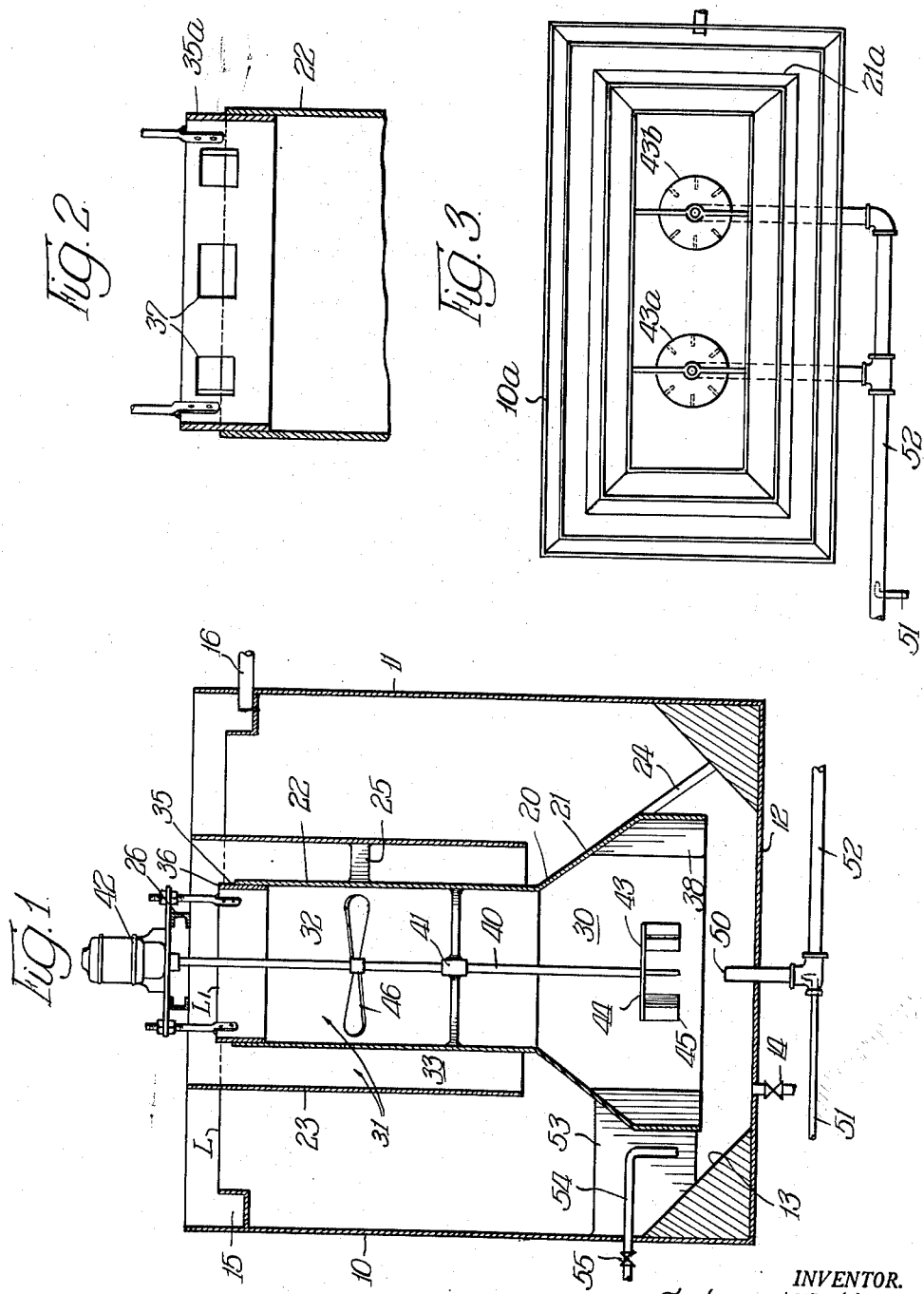
INVENTOR.
Anton A. Kalinske,
BY J. Gunz
agent Patented May 18, 1954

2,678,914

UNITED STATES PATENT OFFICE 2,678,914

APPARATUS FOR TREATING POLLUTED LIQUIDS

Anton A. Kalinske, Elmhurst, Ill., assignor to Infilco Incorporated, Tucson, Ariz., a corporation of Delaware Application April 2, 1949, Serial No. 85,102

9 Claims. (Cl. 210—8)

1

This invention relates to apparatus and process for the treatment of polluted liquids, such as sewage and other waste liquids and polluted surface waters. More specifically, the invention relates to a novel apparatus and method for the biological purification of such liquids by what is generally called activated sludge, and the clarification of the purified liquid.

For purposes of simplification and illustration I will refer herein sometimes to "sewage"; it should however be understood, that the term "sewage" is used herein in its broadest sense, to denote polluted liquids irrespective of whether they are treated to make their discharge to waste or their use permissible. Thus, the term "sewage," as used herein, denotes in addition to domestic sewage, any kind of liquid wastes, mixtures of such wastes or of sewage with such waste or wastes, as well as polluted surface waters.

When using herein terms such as "holding time" or "treating time" I wish to denote detention based on throughput only.

It is an object of this invention to provide an improved activated sludge apparatus and process.

A specific object of the invention is to reduce the treating time of an activated sludge process and thereby reduce the size and cost of the apparatus and of the site for its installation, and the operating cost of the plant.

Another object of the invention is to provide better utilization of the compressed air in an activated sludge plant whereby the quantity of compressed air used can be much smaller than the quantity heretofore used in conventional diffused air plants.

Another object is to provide an activated sludge plant wherein raw or settled waste liquid and air or oxygen under pressure are instantaneously dispersed throughout the entire contents of the aeration chamber.

Another object is to provide an activated sludge process, and apparatus therefor, wherein the clarification of the mixed liquor is obtained by separation of clarified liquid from a circulating body of mixed liquor.

Another object of the invention is to provide an activated sludge process and apparatus wherein the activated sludge is held in suspension as long as it is used in the process, and only waste sludge leaving the process is allowed to settle.

Another object of the invention is to provide an apparatus and a process wherein the raw or settled waste liquid to be treated and the oxygen used in its treatment are introduced into the aeration chamber conjointly or at adjacent points and are quickly dispersed through a volume of mixed liquor under treatment several times the volume of newly added waste liquid.

In its broadest sense, the activated sludge process may be said to involve treating raw or preclarified waste liquid, which may contain suspended, colloidal and dissolved pollute, with a sludge containing aerobic bacteria in the presence of sufficient oxygen to keep the bacteria in an active condition, and with sufficient agitation to maintain the sludge and waste liquid thoroughly mixed. Many diverse theories have been stated regarding the exact functioning of the activated sludge process, however it is now generally recognized that the process involves both bacterial oxidation of organic matter in suspension and solution, and agglomeration of suspended and colloidal solids.

In actual practice of the conventional activated sludge process the polluted liquid is usually settled in a primary clarifier to permit the depositing and removal of the more readily settleable solids. The overflow from the primary clarifier flows to an aeration basin or basins where it is mixed with activated sludge separated from previously aerated polluted liquid, and aerated, usually for periods of about eight to ten hours. The aerated mixture of activated sludge and polluted liquid, the so-called mixed liquor, is then commonly settled in a secondary clarifier for about two hours, and the effluent of the secondary clarifier is usually suitable for discharge into a water course. A portion of the sludge which settles in the secondary clarifier is returned to the aeration basin and provides the activated sludge used in the treatment of the polluted liquid therein, while another portion, which is in excess of the sludge needed in the aeration basin, is wasted.

The aeration of the polluted liquids has been carried out mainly by two different methods. In one method compressed air is diffused into the mixed liquor on its way through the aeration basin from the inlet end to the outlet end, usually through porous plates or nozzles arranged along the length of the aeration basin. In the other method mechanical equipment is used for introducing oxygen from the atmosphere into the mixed liquor and at the same time provide the necessary agitation for mixing of sewage and activated sludge and for keeping or maintaining the sludge in suspension. This is done in various ways, as by agitation of the liquid surface in the aeration basin by heaters, paddles and the like in such a manner as to induce circulation of the tank contents, or by spraying of a portion of the mixed liquor over the liquid surface, or by drawing surface liquid into the mixed liquor in the aeration basin. It has also been proposed to combine diffusion of compressed air with paddle agitation of the liquid surface.

In the diffused air method of aeration the oxygen is generally made available in a progressive manner, that is the mixed liquor on its way through an elongated aeration basin is dosed with successive portions of air, and, vice versa, each portion of oxygen supplied is diffused only in a small portion of the contents of the aeration basin. The same is true of paddle aeration, where the sewage usually flows through long channels and is acted upon by successive paddles. In the so-called mechanical aerators, air from the atmosphere is drawn into the mixed liquor and mixed with the entire contents of the aeration basin. However, the quantity of oxygen provided in this manner is relatively small and therefore a very long holding time is needed. Further, while the mechanical aerators do not in and of themselves use progressive aeration as do diffused air aerators, they are, except in very small plants, used in series, and then have the same characteristic of progressive aeration by successively introducing small quantities of air into the mixed liquor, each quantity of air being introduced only into a portion of the entire mass of mixed liquor under treatment.

In my new apparatus and process aeration is carried out by means of air, or oxygen, under pressure. However, instead of introducing the air, or oxygen, progressively, as in the conventional diffused air methods, the air, or oxygen, is introduced in one location of the aeration chamber where it is immediately picked up by, and dispersed through the circulating contents of the chamber. The sewage to be treated is introduced in like manner, so that there is obtained an almost instantaneous mixing and dispersion of entering sewage and oxygen with each other and with the entire contents of the aeration basin. Due to this method of operation each volume of newly entering sewage is contacted with and acted upon by much larger quantities of air and activated sludge than are introduced into, or held in, the process per volume of sewage to be treated.

Prior art activated sludge treating plants have in common that the final separation of the mixed liquor into purified effluent and activated sludge, (part of which must be returned to the aeration basin) is effected by depositing the sludge under quiescent conditions, be it in a settler or on a filter.

The use of a fully deposited sludge as the source of activated sludge for the treatment of sewage is objectionable in various respects. In the first place, the sludge has to be resuspended and this involves loss of power as compared with holding the sludge in suspension. Further, settling impairs the faculty of the sludge of assisting in the agglomeration of fine particles into larger sludge flocs. It is a well known fact that once solids have been fully deposited as a sludge, whether they be thereafter resuspended or not, their capacity of assisting in coagulation and in agglomeration is not nearly as high as that of unsedimented suspended solids. Further, and most important, such separation of sludge by depositing necessitates holding the sludge for prolonged periods under non-aerobic conditions, whereby the sludge becomes somewhat dormant and the bacteria are not in the most vigorous state for active biological oxidation of the sewage pollute. Such deposited activated sludge must either be aerated before its reuse in the aeration basin, to re-activate the bacteria, or the oxygen provided in the inlet portion of the aeration basin will be consumed to the greatest part in activating the bacteria and the biological purification of the sewage will proceed relatively slowly.

In my apparatus and process this drawback is avoided. The activated sludge formed in the treatment of polluted liquid in the aeration chamber and used therein over and over again, is not permitted to deposit, or even remain quiescent, or exposed to anaerobic conditions at any time, but is maintained in suspension and circulation under aerobic conditions in the treating zone until it is discarded as waste sludge. According to my invention, only the excess sludge is permitted to deposit in a quiescent concentration chamber from where it is sent to waste. Since only a small quantity of sludge is allowed to settle, the concentrator can be located within the treating apparatus and the cost and space for separate final clarifiers and for pumping return sludge can be saved.

Briefly, when considered as a process, my invention comprises the rapid dispersion of oxygen and sewage throughout a large body of mixed liquor in an aeration zone, the continuous circulation of mixed liquor from the outlet portion of the aeration zone to its inlet portion, which circulation is at least partially effected by air lift, the separation of undissolved gas from the circulating liquid, the separation of clarified sewage from the circulating mixed liquor, the displacement of an output portion of clarified sewage by newly entering sewage and the withdrawal of waste sludge from the process.

I contemplate using compressed air, or pure oxygen under pressure. Therefore, it should be understood that where I speak of "air" herein, this term is used to denote also pure oxygen, and vice versa, where I speak of oxygen, this term denotes both the oxygen contained in compressed air and pure oxygen introduced per se.

My new apparatus provides an aeration chamber, a passageway for the circulation of the mixed liquor under aerobic conditions, a quiescent clarified liquid zone and a quiescent zone for settling of waste sludge, all conveniently located in one relatively small tank. The entire holding time of my apparatus, for the combined biological purification and clarification steps for treatment of normal strength domestic sewage may be of the order of about two and one-half hours, with results which compare favorably with those obtained with holding times of from eight to ten hours for the biological purification and about two hours for final clarification in the conventional activated sludge process and with holding times of about three or more hours for the biological purification and about two hours for clarification in the high-rate activated sludge process.

My invention will be more fully understood by reference to the drawings which form a part of this specification and wherein Figure 1 is a cross sectional view of a preferred embodiment of my invention;

Figure 2 is an enlarged cross sectional view of a modification of the adjustable sleeve of Figure 1; and Figure 3 is a diagrammatic plan view of the invention as applied to an elongated tank.

The preferred apparatus comprises a tank, which may be of any suitable size and shape but in Figure 1 is shown for purposes of illustration as a round tank 10 having a side wall 11 and a substantially flat bottom 12. The lower portion of the tank wall may be sloped inwardly as shown at 13 to facilitate flow to the center of the tank and avoid deposits on the floor along the wall 11. A valved drain 14 may lead from the tank to permit draining of the apparatus for inspection, repair and the like. A peripheral launder 15 communicates with an effluent pipe 16 and establishes the liquid level L in the tank 10.

Axially aligned within the tank 10 is a vertically extending partition structure 20 comprising a frusto-conical hood 21 spaced above the floor 12 and a cylindrical wall or inner tube 22 extending upwardly from the upper portion of the hood 21 as shown. An annular wall or outer tube 23 surrounds the inner tube 22 and extends from an elevation above the liquid level downwardly to an elevation adjacent the lower end of the inner cylindrical wall 22. The partition structure 20 may be supported in spaced relationship to the tank bottom by any suitable means, such as legs, or brackets 24 as shown. The outer tube 23 may derive support from the inner tube, as by brackets 25, which may also serve as baffles, or it may be supported from a beam, or bridge 26 spanning the tank 10.

The partition structure 20 and the outer tube 23 form in the tank 10 an aeration chamber 30 located under the hood 21 which is open at its bottom to the lower portion of the tank, and a passageway 31 for mixed liquor leading from the upper portion of the aeration chamber 30 to the liquid surface and thence back to the lower portion of the tank. The passageway 31 comprises an upflow section 32 within the inner tube 22 and a downflow section 33 within the outer tube 23. The downflow section 33 must be of sufficient width that the downward flow of the mixed liquor returning to the lower portion of the tank is relatively slow in order to permit undissolved gas entrained in the mixed liquor to escape to the surface countercurrently to the flow of the liquor.

It is desirable to control the rate of flow through the passageway 31. This can be done by adjusting the elevation at which flow from the inner tube 22 to the outer tube 23 takes place. As shown in Figure 1 a sleeve 35 is provided which fits snugly into the inner tube 22. The sleeve may be supported from the bridge 26 by turnbuckles, or the like, so that it can be raised or lowered as desired. The sleeve 35, in effect, forms a vertically adjustable weir 36.

Instead of using the upper edge 36 of the sleeve 35 as an overflow weir, the sleeve may be apertured, as shown in Figure 2, to provide a submerged overflow area, which is shown in the form of a plurality of submerged orifices 37 but may be a continuous slot. By lowering the sleeve 35a any desired portion of the orifices 37 can be closed by the inner tube 22, while in the uppermost position of the sleeve the orifices are entirely uncovered. In large installations the sleeve 35a may be rigidly fixed to the bridge 26 and individual vertically movable gates may be provided for the several orifices. Obviously, the orifices 37 could be in the inner tube and the sleeve be made solid with the same result.

Radial baffles 38 are provided under the hood 21 and extend inwardly therefrom, to reduce the rotation of liquid along the hood.

Axially aligned within the partition structure 20 is a shaft 40 which may be journaled in a bearing 41, as shown. The shaft 40 may be driven by any suitable means, such as a motor-reducer 42 which may be supported above the tank as on the beam or bridge 26. A rotor 43 is rigidly affixed to, and rotatable with the shaft.

The rotor 43 may comprise a horizontal plate 44 and a plurality of vertically extending blades 45 mounted on the underside of the plate 44. The blades 45 are spaced around the periphery of the plate 44 and extend approximately radially inwardly therefrom only partway to the shaft 40. Preferably, the width of the blades may be approximately one-seventh of the diameter of the plate—and their length from about one-fourth to about one-third the diameter of the plate. Eight blades are indicated in the drawing for purposes of illustration, but the actual number of blades used will depend on the size of the rotor which again will depend on the size of the aeration chamber and the capacity of the apparatus. The peripheral distance between blades preferably should not exceed 15 to 20 inches so that with large rotors a much larger number of blades is desirable.

Such a rotor provides a very efficient means for breaking up the air into very fine bubbles and for rapidly dispersing the entering air and sewage through, and intimately mixing them with, the entire body of mixed liquor in the aeration chamber. The rotor 43 is so positioned in the aeration chamber 30 and so proportioned to the size of the aeration chamber that the flow set up by its rotation embraces all the liquid in the aeration chamber. The cyclic flow pattern set up by the rotor includes a radial outward discharge flow at the level of the blades and a radial inward suction flow along the bottom of the tank 10.

A propeller 46 is shown affixed to the shaft 40 within the inner tube 22. Usually, such a propeller will not be needed, as the circulation through the tubes 22, 23 can be maintained by air lift. However, in some cases, especially when pure oxygen is used in my apparatus for the aeration of the mixed liquor, there may not remain a sufficient amount in the form of undissolved gas bubbles to establish a lift for circulating the mixed liquor through the passageway 31. In such case a propeller 46 may be used to supplement the lift due to rising gas bubbles.

It is essential in my apparatus that the liquid to be treated and the air or oxygen used in the treatment be introduced into the suction flow to the rotor 43, so that both the liquid and the oxygen are immediately picked up and dispersed by the rotor throughout the entire contents of the aeration chamber. The inlets for air and liquid can discharge separately, at spaced points, but the oxygen should always be discharged below the plate 44 to prevent its escape before it has been dispersed through the mixed liquor. One way of doing this is to make the shaft 40 hollow and introduce the compressed air or oxygen therethrough directly into the center of the rotor, in known manner. Preferably, however, oxygen and sewage are introduced at adjacent points or, as shown in Figure 1, at a common point of discharge 50 just below the rotor. Obviously, but not necessarily, the air inlet line 51 can discharge into the sewage inlet conduit 52 at any suitable distance from the tank whereby a pre-mixing of sewage and air and pre-aeration of the sewage is effected.

While so far I have described for purposes of illustration and exemplification the use of a single rotor, which is preferred in non-elongated tanks, I contemplate using two or more rotors in longitudinal tanks. Such an arrangement is shown diagrammatically in Figure 3. The rotors 43a and 43b are positioned at the longitudinal axis of the tank 10a under the elongated hood 21a. The incoming sewage and air are introduced in parallel into the suction flow of the two rotors, as shown, each rotor receiving half of the entering sewage and air. Thus, also in this form of apparatus, the air and sewage are immediately dispersed through, and intimately mixed with, the entire contents of the aeration chamber in the same manner as described for a round tank.

A sludge concentrator 53 is provided in the lower portion of the tank 10. A waste sludge pipe 54 provided with a valve 55 leads from the concentrator 53 to outside the tank 10. The concentrator 53 can be quite small, as it serves only for thickening the excess or waste sludge which is withdrawn from the process, this being the only sludge permitted to settle in my apparatus. The balance of the activated sludge returns from the outer draft tube to the aeration chamber without settling. By regulating the quantity of activated sludge withdrawn through the waste sludge line—the mixed liquor surface can be maintained at any desired elevation. Preferably, the mixed liquor surface is maintained approximately at the elevation of the lower end of the outer draft tube, so that clarified treated sewage separates from a laterally flowing stream of mixed liquor. This separation is well defined, with a sharp demarcation line between the clarified sewage above and the turbid mixed liquor below.

The operation of the apparatus will be readily understood. The sewage to be treated in my apparatus may be raw sewage, but preferably is settled raw sewage, i. e. sewage from which settleable solids have been previously removed in conventional manner, as in a grit chamber or a primary clarifier, not shown. The lower portion of the tank, and the upflow section 32 and downflow section 33 of the passageway 31 are normally completely filled with mixed liquor, and the upper outer portion of the tank is normally filled with purified and clarified sewage. Rotation of the rotor 43 by the motor-reducer 42 sets up a cyclic flow of mixed liquor throughout the aeration chamber 30 and the underlying portion of the tank. The sewage arriving through conduit 52 and air or oxygen under pressure arriving through pipe 51 are discharged into the suction flow to the rotor 43 and quickly dispersed by the rotor through the entire body of mixed liquor in the aeration chamber 30. The air is broken up in minute bubbles from which oxygen is readily absorbed by the mixed liquor.

The gas bubbles rising through the upflow section 32 produce an air lift action which causes a circulation of mixed liquor through the inner tube 22 and the outer tube 23 back to the lower part of the tank. Due to the air lift action the liquid level $L^1$ in the inner tube is somewhat higher than the liquid level L established by the overflow of launder 15. If lift due to rising gas is not sufficient to maintain the circulation, the propeller 46 may be used to supplement or replace it. The mixed liquor flows from the inner tube 22 into the outer tube 23 over the weir 36 formed by the adjustable sleeve 35, or through the submerged orifice or orifices 37 in the sleeve 35a. From the surface of the mixed liquor flowing laterally from the bottom of outer tube 23 an output portion of treated clarified sewage separates and passes upwardly into the clarified liquid zone from where it is withdrawn through the launder 15 and effluent conduit 16. The balance of mixed liquor returns downwardly to the bottom portion of the tank and is picked up by the suction flow to the rotor 43 and drawn back into the aeration chamber 30 to be redispersed therethrough.

During the flow through the inner and outer tubes undissolved air separates in form of bubbles from the mixed liquor and escapes through the open top of the tubes, carrying with it carbon dioxide formed by the bacterial activity in the sludge. Most of the air will escape during the upflow. However, the downflow must be sufficiently slow to permit the counter-current escape of air bubbles still entrained in the mixed liquor in order to prevent their release at the mixed liquor surface where they would disturb proper clarification. This counter-current flow of mixed liquor and air offers additional time for oxygen adsorption by the mixed liquor.

The mixed liquor surface from which the clarified sewage emerges may be maintained at the desired elevation by regulating the quantity of sludge wasted through concentrator 53.

The rate of circulation through passageway 31 is controlled by adjusting the height of the weir 36 or the size of the orifices 37 through raising or lowering of the sleeve 35 or 35a, respectively. Proper control of the circulation rate is quite essential in this apparatus. If the circulation rate is excessive too much disturbance at the mixed liquor surface will result in consequent poor clarification. If, on the other hand, the circulation is insufficient, there will be a tendency for the intense agitation under the hood to be carried into the outer portion of the tank and disturb proper clarification.

Pilot plant tests of my new apparatus and process have been conducted for several months' continuous operation, treating screened domestic sewage taken from a conventional sewage plant. The B. O. D. of the screened raw sewage varied from about 50 to 200 p. p. m. (parts per million). The pilot plant produced an effluent having a B. O. D. of 10 to 25 p. p. m. with a total retention time of two and one-half hours. The B. O. D. and suspended solids reduction obtained were consistently practically identical with those obtained in the conventional plant treating the same sewage with mechanical aerators in series but having a retention time of about ten to twelve hours. The sludge produced was denser than the sludge from the conventional mechanical aeration plant and its Mohlman's index was lower. The air requirement of my apparatus and process is very low. My pilot plant results were obtained using one-half cubic foot of air per gallon of sewage treated, while in a conventional diffused air plant one cubic foot per gallon is needed to produce the same results.

These results show an enormously increased rate of oxidation and clarification of sewage treated by my process and apparatus and a very favorable rate of oxygen utilization. The rapid oxidation obtained is due in part to the rapid dispersion of air and sewage to be treated through, and intimate mixture with, the entire body of mixed liquor in the aeration zone, whereby each volume of sewage is contacted with many times the quantity of air and activated sludge that is introduced per volume of sewage. In conventional activated sludge plants each volume of sewage comes in contact only with the volumes of air and activated sludge introduced for treatment of such volume of sewage.

Another important factor contributing to the rapid oxidation of the sludge is the complete elimination of any quiescent holding period, or stagnant condition, between periods of aeration of the sludge in the aeration chamber. Due to the continuous circulation of mixed liquor described, the bacterial population of the sludge is constantly held under aerobic conditions and the organisms are enabled to work at their maximum efficiency.

The rapid clarification obtained in my apparatus is due to the fact that clarification is obtained by separation of clarified sewage from a laterally flowing stream of mixed liquor. The density and good settling characteristics of the sludge produced further enhance the clarification rate.

Due to these high oxidation and clarification rates, relatively small apparatus can handle large volumes of sewage. In large plants several of my apparatus may be used and will usually be operated in parallel. However, they may be connected in series, if desired. When treating, for example, waste waters which are difficult to purify, it may be advantageous to use a stage treatment. Furthermore, my process and apparatus can be used for treatment of polluted liquids that have had a prior treatment by other methods, such as chemically, or on a trickling filter. Therefore, while usually raw or raw-settled sewage will be treated in my apparatus, I wish it to be understood that when I refer to the "liquid to be treated" I include in this term also polluted liquids that have been partially treated whether by the same or by different methods.

It will be seen that I have invented a new process and apparatus for the treatment of polluted liquids with activated sludge whose results are comparable to those of conventional plants but are obtained in a fraction of the time needed in conventional plants, and with a smaller amount of air per gallon of sewage treated.

Many modifications and variations of the invention, as set forth herein, may be made without departing from the spirit and scope of the invention. Accordingly, the figures and specification herein are to be considered for purposes of illustration rather than of limitation.

I claim:

1. An apparatus for treating a liquid with a gas comprising a tank having a bottom and an upstanding wall, a treated liquid outlet from the upper portion of said tank, means for withdrawing sludge from the lower portion of said tank, a partition structure in said tank extending upwardly from an elevation spaced above the bottom of said tank, an inlet into the space within said partition structure from the lower portion of said tank, an outer partition coaxial with said partition structure and extending from adjacent the top of said tank to a lower portion of said tank, characterized in that said partition structure and outer partition form in said tank a lower dispersing chamber and a passageway for a gas lift supported circulation from said dispersing chamber to the top portion of the tank and back to the lower portion of the tank, which passageway is of sufficient width to permit undissolved entrained gases to escape, and further characterized by dispersing means of the radial flow type rotatably mounted in said dispersing chamber, said dispersing means being dimensioned and positioned to set up a flow pattern in predominantly horizontal planes embracing the contents of said dispersing chamber, means for rotating said dispersing means, and inlet conduits for liquid and gas discharging into said dispersing chamber underneath said dispersing means.

2. In an apparatus for treating liquid comprising a tank, a vertically extending partition structure in said tank spaced above the bottom thereof, said partition structure forming a dispersion chamber in open communication with the lower portion of the tank, an outlet for treated liquid from the upper portion of said tank, and an outlet for sludge from a lower portion of said tank, means for providing a vertical circulation of a portion of the contents of said dispersion chamber in excess of the throughput leading from said dispersion chamber and returning thereto, said means including a passageway leading upwardly from the upper portion of said chamber, an outer partition spaced around said passageway and extending from an elevation adjacent the top of the tank and being in open communication with said tank at its lower end, and adjustable overflow means from said passageway to the space between said partition structure and said outer partition, said space being of sufficient width to permit entrained undissolved gas to rise countercurrently to the downward flow of liquid, and means providing a predominantly horizontal circulation of the contents of said dispersion chamber, said last named means including a rotary disperser in said dispersion chamber, said disperser being of the radial flow type and including a horizontal plate and a plurality of vertical blades affixed to the underside of said plate, said plate and blades being dimensioned and positioned to set up a predominantly horizontal flow pattern embracing the entire contents of said dispersion chamber, conduit means for introducing liquid to be treated and gas discharging underneath said plate, and means for rotating said disperser.

3. The apparatus of claim 2 wherein said adjustable means comprises a vertically adjustable weir associated with the upper end of said passageway.

4. The apparatus of claim 2 wherein said adjustable means comprises at least one submerged orifice affording communication from said passageway to said space, and means for controlling the effective size of said orifice.

5. Apparatus for treating sewage with activated sludge and clarifying the treated sewage comprising a tank, an outlet for clarified treated sewage including an overflow from the upper portion of said tank, a solids outlet from the lower portion of said tank, a vertically extending partition in said tank including a lower open bottom frustoconical hood portion spaced above the tank bottom and an upper tube, and an outer annular tube surrounding said upper tube and extending downwardly from an elevation above said overflow, characterized by a sleeve associated with, and vertically adjustable with respect to, the upper end portion of said inner tube, a plurality of orifices providing a submerged overflow area from said inner tube to said outer tube, the area provided by said orifices being variable by vertical adjustment of said sleeve, and said outer tube being of sufficient width to permit the escape of entrained undissolved gases, a rotor-disperser axially aligned within said hood portion, said rotor-disperser being of the radial flow type setting up a predominantly horizontal circulation and so dimensioned that said circulation embraces the contents of said hood portion and the underlying portion of said tank, means for rotating said rotor, and conduit means introducing the sewage to be treated and the air for the treatment, said conduit means discharging underneath said rotor, whereby incoming sewage and air are immediately dispersed throughout the contents of said hood portion and the underlying portion of said tank.

6. Apparatus for biological purification and clarification of polluted liquid comprising an elongated tank, an elongated aeration chamber spaced above the bottom of said tank, a passageway leading from the upper portion of said aeration chamber upwardly to adjacent the top of said tank and thence downwardly to a lower portion of said tank and being of sufficient width to permit undissolved gases to escape, outlet means for purified and clarified liquid from the upper portion of said tank, outlet means for waste solids from the lower portion of said tank, at least two rotors mounted in said aeration chamber aligned on the longitudinal axis of said tank, said rotors being of the radial flow type and dimensioned to set up, upon their rotation, radial predominantly horizontal flow patterns tangent to one another and jointly embracing the contents of said aeration chamber and the underlying portion of said tank, conduit means discharging liquid to be treated and air under pressure under each of said rotors, whereby the liquid to be treated is immediately dispersed through the entire contents of said aeration chamber, and means for rotating said rotors.

7. A unitary aeration and clarification apparatus comprising a tank, an outlet for treated clarified liquid from the upper portion of said tank, an outlet for solids from a lower portion of said tank, partition means in said tank having vertical extension from an elevation spaced above the bottom of said tank to an elevation above said outlet for treated liquid, an inlet into the space within said partition means from the lower portion of said tank, an outlet from said space to the lower portion of said tank, characterized by conduit means discharging air and liquid to be treated upwardly into the lower part of said space, and a disperser of the radial flow type axially aligned in said tank in said lower part directly above the discharge end of said conduit means for air and liquid to be treated and adapted to set up a flow pattern embracing the entire contents of said lower part and having a radial outward flow to said partition means and a radial inward flow adjacent the bottom of said tank, whereby incoming air and liquid discharged below said dispenser are immediately dispersed throughout the contents of said lower part, the upper part of the space within said partition being of sufficient width to allow undissolved gases to escape.

8. An apparatus for biologically purifying and clarifying polluted liquids comprising a tank, an overflow for purified and clarified liquid from the upper portion of said tank, said overflow establishing a normal liquid level in said tank, outlet means for waste sludge from a lower portion of said tank, an open bottom aeration chamber in the bottom portion of said tank and spaced above the floor of the tank, a partition means forming a passageway for a circulation in predominantly vertical planes leading from the upper portion of said aeration chamber to said liquid level and back into a lower portion of said tank, said passageway being of sufficient width to permit undissolved gases entrained by the liquid to escape, a rotor disperser of the radial flow type in said aeration chamber, said rotor disperser being dimensioned and positioned to set up a cyclic radial and predominantly horizontal flow pattern embracing the entire contents of said aeration chamber and the underlying portion of said tank and including a lower inward suction flow adjacent the floor of said tank, means for rotating said rotor disperser, and conduit means for delivering incoming liquid to be treated and oxygen into said suction flow discharging underneath said rotor, whereby said incoming liquid and oxygen are immediately dispersed through the entire contents of said aeration chamber.

9. Apparatus for treating a liquid with a gas comprising a tank, an overflow for treated liquid from the upper portion of said tank, a solids outlet from a lower portion of said tank, an open bottom chamber in the lower portion of said tank, and inlet conduits for liquid to be treated and for gas for the treatment discharging into said chamber, characterized by the combination of means for setting up a horizontal circulation of the contents of said chamber, into which circulation said liquid to be treated and gas are instantaneously incorporated, with means providing a vertical circulation of a portion of said contents in excess of the throughput leading from said chamber and returning thereto, said first means comprising a rotor-disperser directly above the discharge ends of said inlet conduits, said rotor-disperser being of the radial flow type and being dimensioned so that the flow pattern set up by it embraces the contents of said chamber, and said second means including a passageway having an upflow section leading from the upper part of said chamber to an elevation adjacent said overflow and a downflow section discharging to a lower portion of said tank, said passageway being of sufficient width to allow undissolved gases to escape.

References Cited in the file of this patent

UNITED STATES PATENTS

| Number | Name | Date |
| --- | --- | --- |
| 1,617,014 | Derleth | Feb. 8, 1927 |
| 1,797,147 | Imhoff et al. | Mar. 17, 1931 |
| 1,900,809 | Hammerly | Mar. 7, 1933 |
| 2,067,161 | Durdin | Jan. 5, 1937 |
| 2,076,529 | Durdin | Apr. 13, 1937 |
| 2,118,370 | Wessblad et al. | May 24, 1938 |
| 2,324,593 | Persson et al. | July 20, 1943 |
| 2,364,023 | Green | Nov. 28, 1944 |
| 2,400,598 | Prager | May 21, 1946 |
| 2,425,932 | Green et al. | Aug. 19, 1947 |
| 2,429,315 | Green | Oct. 21, 1947 |
| 2,492,486 | Kivari et al. | Dec. 27, 1949 |

FOREIGN PATENTS

| Number | Country | Date |
| --- | --- | --- |
| 14,733 | Great Britain | of 1915 |